Figure 1:
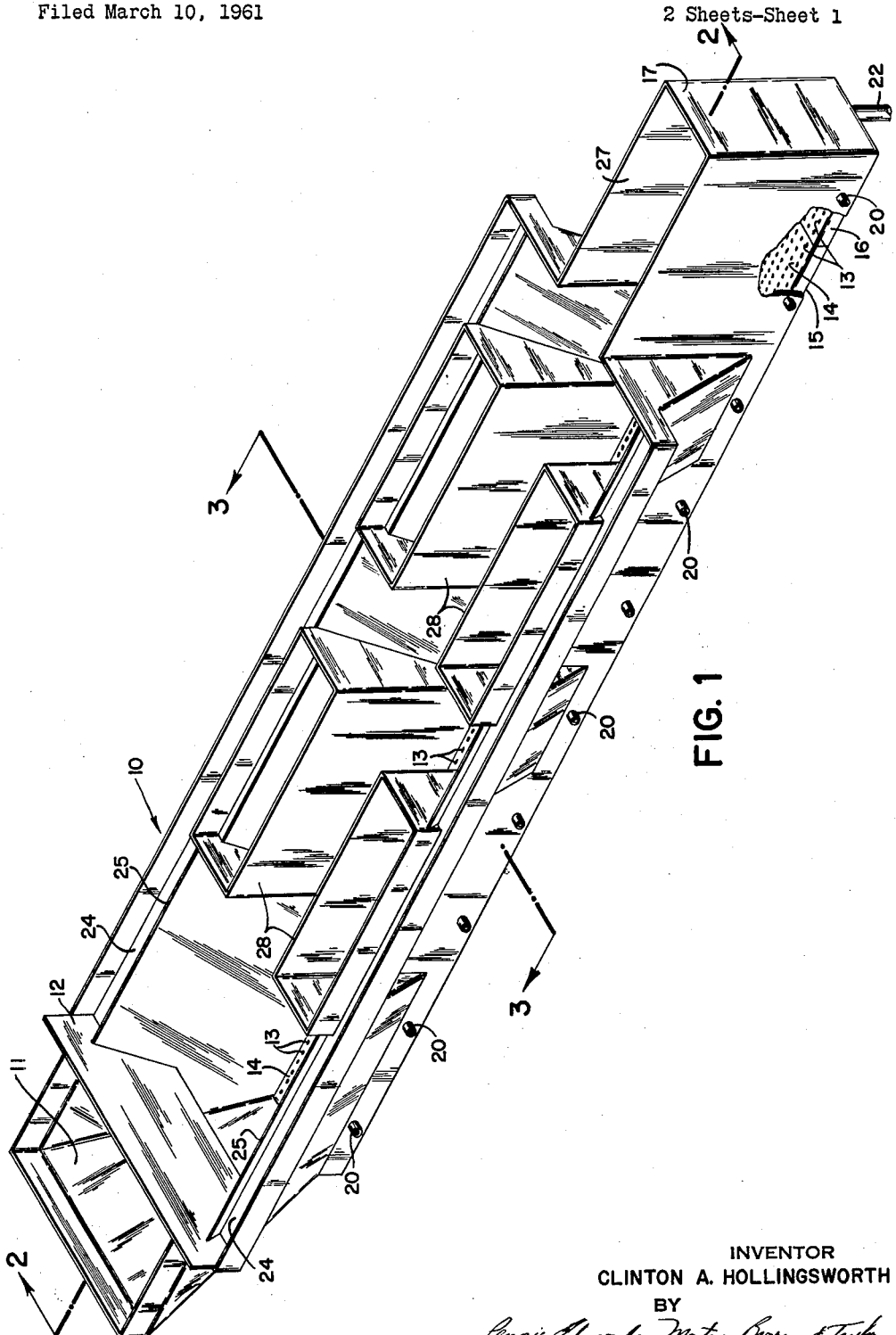

Dec. 25, 1962  C. A. HOLLINGSWORTH  3,070,228
COUNTERFLOW HYDRO-DESLIMER
Filed March 10, 1961  2 Sheets-Sheet 1

INVENTOR
CLINTON A. HOLLINGSWORTH
BY
*Pennie, Edmonds, Morton, Burrows & Taylor*
ATTORNEYS

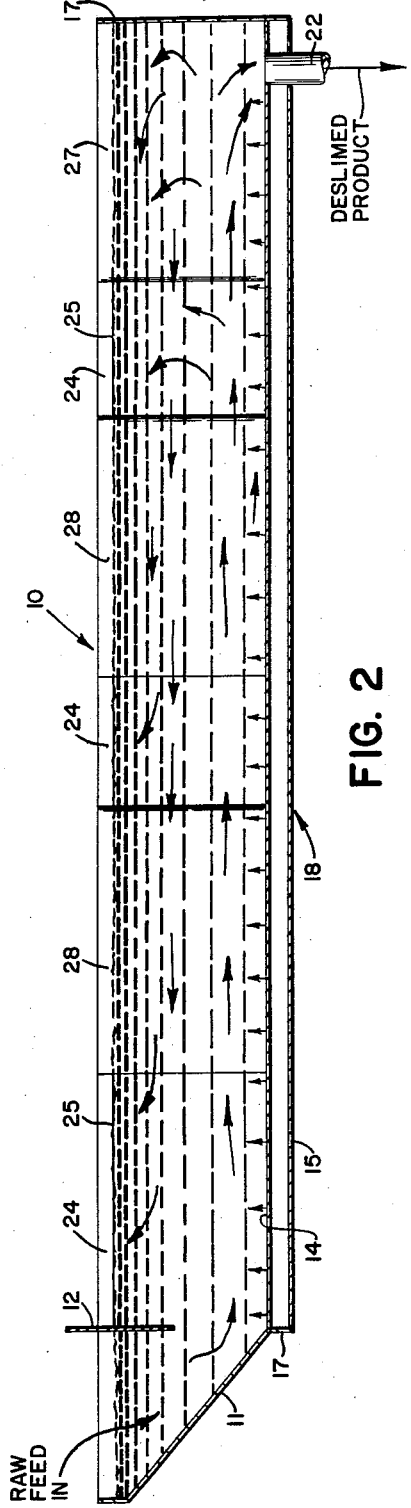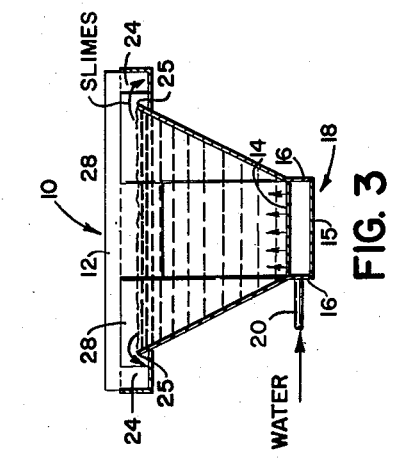

United States Patent Office
3,070,228
Patented Dec. 25, 1962

3,070,228
COUNTERFLOW HYDRO-DESLIMER
Clinton A. Hollingsworth, Lakeland, Fla., assignor to Smith-Douglass Company, Incorporated, Norfolk, Va., a corporation of Virginia
Filed Mar. 10, 1961, Ser. No. 94,921
4 Claims. (Cl. 209—160)

This invention relates to hydro-deslimers, and more particularly to an improved counterflow hydro-deslimer.

When native ores and minerals are crushed or ground to prepare these raw materials for subsequent treatment (e.g. froth flotation) a quantity of very finely divided particles of the material is inevitably formed. Moreover, certain minerals such as Florida phosphate rock are found in their native state admixed with large quantities of clay and other very finely divided or colloidal particles. When these raw materials are mixed with water, the very finely divided particles form "slimes" which interfere with subsequent operations and which, therefore, must be removed from the larger particles of the raw material. A number of devices have been developed to effect the removal of slimes from aqueous suspensions of slime, containing raw materials, and one of the most useful and effective of these devices is the so-called hydro-deslimer.

A conventional hydro-deslimer is a long trough-like container or receptacle full of water and having a raw feed input at one end of the trough and a deslimed product outlet opening in the bottom at the other end of the trough. The bottom of the trough is formed with a plurality of holes through each of which a stream of water flows upwardly into the trough-like container. Raw feed material (e.g. washed and screened phosphate rock) is introduced into one end of the water-filled trough, additional water being introduced into the trough through the plurality of small holes in the bottom thereof. The raw feed material flows along the bottom of the trough toward the discharge opening at the opposite end thereof, and as the feed material flows toward the discharge opening the water flowing upwardly into the trough through the holes in the bottom thereof washes the slime particles from the larger particles of the feed material. The deslimed larger particles of feed material continue to flow along the bottom of the trough to the discharge end thereof where the deslimed material is discharged therefrom through the discharge opening along with a portion of the water continuously being introduced into the trough. The slimes removed from the larger particles of the feed material are carried by the excess water flowing upwardly and into a slimes overflow launder disposed about the upper edges of the trough-like container. Thus the slimes flow generally upwardly from the material being deslimed and outwardly into the slimes launder, and there is little flow of the slimes in the opposite direction to that of the material being deslimed. By appropriate adjustment of weir levels along the length of the overflow launder it is possible to cause the upper layers of the water in the hydro-deslimer to flow in the opposite direction from that of the feed material flowing along the bottom of the deslimer toward the discharge opening. However, the velocity of the counterflowing upper layers of water is relatively low and the degree of counterflow action obtained is limited and relatively ineffective. Accordingly, conventional hydro-deslimers provide a simple and reasonably efficient means for obtaining a substantially deslimed product. However, it has sometimes been found difficult to obtain as completely a deslimed product as is desired due to entrainment or mixing of slimes with the water and deslimed product being withdrawn from the apparatus through the discharge opening.

I have now found that the operation of hydro-deslimers can be markedly improved, and the problem of entrainment or admixture of slimes with the aqueous suspension of larger particles of feed material withdrawn through the discharge opening can be largely eliminated, if a positive counterflow action is established in the apparatus by increasing the velocity of the counterflowing upper layers of the water so as to move the suspended slimes more rapidly from the discharge end toward the feed input end of the apparatus. Moreover, I have found that this desired increase in velocity of the counterflowing upper layers of liquid in the apparatus can be obtained by providing a constriction in the trough-like container adjacent the discharge end of the apparatus and in addition one or more constrictions in the main portion of the trough-like container between the discharge and raw feed input ends thereof. Accordingly, my improved counterflow hydro-deslimer comprises an elongated trough-like container having a raw feed input at one end of the trough and a deslimed product outlet opening formed in the bottom of the other end of the trough. The bottom wall is perforated so that a multiplicity of streams of wash water can flow upwardly therethrough into the trough, and means are provided for supplying wash water to said perforated bottom wall. A slime discharge launder is disposed along each upper longitudinal edge of the trough, and the trough is formed with a constricted portion adjacent the discharge opening and preferably with at least one other constricted portion intermediate the raw feed inlet end and the deslimed product discharge end of the hydro-deslimer.

My invention will be better understood from the following description thereof in conjunction with the accompanying drawings of which FIG. 1 is a perspective view of my new counterflow hydro-deslimer showing it empty of water and with a portion thereof partially cut away, FIG. 2 is a sectional view along lines 2—2 of FIG. 1 showing the counterflow of liquid layers in the hydro-deslimer, and FIG. 3 is a sectional view along lines 3—3 of FIG. 1 showing the liquid containing the slimes overflowing into the slimes launder.

In the embodiment of my invention shown in the drawings my new counterflow hydro-deslimer comprises an elongated trough-like open top container or receptacle 10 formed of sheet metal or the like and having a truncated V-shaped cross-section (shown best in FIGS. 1 and 3) throughout most of its length. One end of the trough is adapted to receive the raw feed being introduced into the hydro-deslimer, and in the embodiment shown in the drawings the raw feed input end of the trough is provided with a sloping end wall 11 which directs the raw feed material introduced into the trough longitudinally toward the opposite or discharge end of the trough. A baffle plate 12 is also provided to insure that the introduction of raw feed material into the trough will not unduly disturb the counterflowing layers of water in the main portion of the trough.

The bottom of the trough 10 is perforated or pierced with a multiplicity of small holes 13 through which water can be introduced into the trough, and means are provided for introducing water into the trough through the holes formed in the perforated bottom wall. In the embodiment shown, the bottom of the trough is provided with a perforated inner bottom wall 14 and an imperforate outer bottom wall 15 which, together with side panels 16 and end panels 17, comprises a water supply manifold 18. Water is introduced into the manifold 18 through a plurality of water pipes 20 and from thence flows upwardly into the trough through the perforations 13 in the inner bottom wall 14, as indicated by the upwardly directed arrows extending from the inner bottom wall in FIGS. 2 and 3 of the drawing. The hydro-deslimer is also provided with a deslimed product discharge opening or pipe 22 positioned at the opposite end of the trough from the raw feed inlet end thereof, and a slimes discharge launder 24 is disposed alongside the upper longitudinal edges 25 of the V-shaped trough. The portion of the trough immediately adjacent the discharge pipe 22 is provided with a constriction or constricted portion 27, and one or more other constrictions or constricted portions 28 of the trough are provided between the discharge end and the feed input end of the hydro-deslimer.

When in use, the hydro-deslimer is filled with water up to the upper longitudinal edge 25 of the longitudinal trough 10. Additional water may be introduced into the trough along with the raw feed material at the input end of the apparatus, and an appreciable quantity of wash water is introduced into the trough through the perforated bottom wall 14 thereof. A portion of the water introduced into the trough is withdrawn therefrom through the deslimed product outlet 22, the balance of the added water overflowing over the upper edge 25 of the trough into the slime discharge launder 24. As a result of the introduction of the wash water through the perforate bottom wall 14, the discharge of a portion of the added water through the pipe 22, the overflow of the balance of the added water into the launder 24 and the effect of the constrictions 27 and 28 on the flow of said water, counter-flowing longitudinal currents or layers of water are established in the trough 10 as indicated by the arrows in FIG. 2 of the drawing.

The raw feed introduced into the hydro-deslimer comprises a mixture of the relatively large particles of raw material to be deslimed and the very finely divided particles or slimes to be removed therefrom. This solid raw material is introduced substantially continuously into the raw feed input end of the apparatus either as a dry mixture of the slimes-containing material or as an aqueous slurry thereof, the solid material falling to the bottom of the trough and being directed by the sloping end wall 11 toward the discharge end of the apparatus. The larger particles of the solid material flow along the bottom of the trough 10 toward the discharge end thereof and in so doing these particles are continuously subjected to the washing and desliming action of the upwardly flowing streams of water entering the trough through the perforate bottom wall 14 thereof. I have found it advantageous to line the bottom of the deslimer trough with lead shot (for example, to a depth of about 2 inches) to prevent plugging of the holes 13 in the inner bottom wall 14 and sifting of solids into the hydraulic compartment therebeneath especially when the apparatus is shut down. The deslimed larger particles of the feed material flow to the discharge opening or pipe 22 and are continuously withdrawn from the trough through this pipe along with a portion of the water contained in the trough. The slimes washed or otherwise removed from the larger particles of feed material are carried upwardly by the upwardly directed streams of wash water, and as these suspended slimes are carried to the counterflowing upper layers of water in the trough they are conveyed by this counterflowing water away from the discharge end of the apparatus. The suspended slimes are then removed from the trough with the water overflowing into the slimes discharge launder 24.

As a result of the constrictions 27 and 28 provided in the trough 10 of the hydro-deslimer, the upper layers of water in the trough are forced to flow away from the discharge end thereof whereby a positive counterflow action is established in the trough, and the velocity of the counterflowing upper layers of water in the trough 10 is substantially greater than that which can be obtained in any hydro-deslimer heretofore known. As a consequence, the slimes are carried more rapidly away from the discharge end of the apparatus thereby minimizing the likelihood of entrainment or mixture of slimes with the deslimed product being removed from the apparatus through the discharge pipe 22 and insuring that the user of my new apparatus will obtain a cleaner and substantially completely deslimed product. The substantially complete removal of slimes from the slimes-containing raw material introduced into my improved hydro-deslimer is of particular importance when preparing deslimed feed for flotation operations which are sensitive to slime. For example, the efficiency of amine-containing flotation reagents employed to float siliceous matter in the beneficiation of phosphate rock is adversely affected by the presence of slimes in the flotation feed, and as most amine flotation reagents are quite expensive reagent costs can become excessive if appreciable amounts of slimes are present in this feed. However, I have found that when my new hydro-deslimer is employed to prepare deslimed flotation feed for an amine flotation operation the consumption, and hence the cost, of the amine reagents employed is reduced on an average of about one-half to one-quarter of that previously required.

From the foregoing description of my counterflow hydro-deslimer it will be seen that I have made an important contribution to the art to which my invention relates.

I claim:

1. A counterflow hydro-deslimer which comprises an elongated trough having a raw feed input at one end of the trough and a deslimed product outlet opening formed in the bottom of the other end of the trough, a perforated bottom wall through which a multiplicity of streams of wash water can flow upwardly into the trough, means for supplying wash water to said perforated bottom wall, a slime discharge launder along each upper longitudinal edge of the trough, the portions of said upper longitudinal edges adjacent said slime discharge launders being slime overflow weirs over which slime-containing water can flow into said launders, the trough being formed with a constricted portion adjacent the discharge opening of the hydro-deslimer, the walls of the constricted portion of the trough being of greater height than the height of the slime overflow weir portions of the longitudinal edges of the trough.

2. A counterflow hydro-deslimer which comprises an elongated trough having a raw feed input at one end of the trough and a deslimed product outlet opening formed in the bottom of the other end of the trough, a perforated bottom wall through which a multiplicity of streams of wash water can flow upwardly into the trough, means for supplying wash water to said perforated bottom wall, a slime discharge launder along each upper longitudinal edge of the trough, the portions of said upper longitudinal edges adjacent said slime discharge launders being slime overflow weirs over which slime-containing water can flow into said launders, the trough being formed with a constricted portion adjacent the discharge opening and with at least one other constricted portion intermediate the raw feed inlet end and the deslimed product discharge end of the hydro-deslimer, the walls of the constricted portions of the trough being of greater height than the height of the slime overflow weir portions of the longitudinal edges of the trough.

3. A counterflow hydro-deslimer which comprises an elongated truncated V-shaped trough having a raw feed input at one end of the trough and a deslimed product outlet opening formed in the bottom of the other end of the trough, a perforated bottom wall through which a multiplicity of streams of wash water can flow upwardly into the trough, means for supplying wash water to said perforated bottom wall, a slime discharge launder along each upper longitudinal edge of the V-shaped trough, the portions of said upper longitudinal edges adjacent said slime discharge launders being slime overflow weirs over which slime-containing water can flow into said launders, the V-shaped trough being formed with a constricted portion adjacent the discharge opening and with at least one other constricted portion intermediate the raw feed inlet end and the deslimed product discharge end of the hydro-deslimer, the walls of the constricted portions of the trough being of greater height than the height of the slime overflow weir portions of the longitudinal edges of the trough.

4. A counterflow hydro-deslimer which comprises an elongated trough having a raw feed input at one end of the trough and a deslimed product outlet opening formed in the bottom of the other end of the trough, a perforated bottom wall through which a multiplicity of streams of wash water can flow upwardly into the trough, a layer of lead shot overlying said perforated bottom wall, means for supplying wash water to said perforated bottom wall, a slime discharge launder along each upper longitudinal wall, a slime discharge launder along each upper longitudinal edge of the trough, the portions of said upper longitudinal edges adjacent said slime discharge launders being slime overflow weirs over which slime-containing water can flow into said launders, the trough being formed with a constricted portion adjacent the discharge opening and with at least one other constricted portion intermediate the raw feed inlet end and the deslimed product discharge end of the hydro-deslimer, the walls of the constricted portions of the trough being of greater height than the height of the slime overflow weir portions of the longitudinal edges of the trough.

References Cited in the file of this patent

UNITED STATES PATENTS

| | | |
|---|---|---|
| 2,293,033 | Mead | Aug. 18, 1942 |
| 2,708,517 | Evans | May 17, 1955 |
| 2,420,180 | Laughlin | May 6, 1947 |